Nov. 9, 1954  J. G. SOLA  2,694,163

VOLTAGE SENSITIVE APPARATUS

Filed March 16, 1951

INVENTOR.
Joseph G. Sola
BY
Thiess, Olson & Mecklenburger
Attys.

United States Patent Office 2,694,163
Patented Nov. 9, 1954

2,694,163

VOLTAGE SENSITIVE APPARATUS

Joseph G. Sola, River Forest, Ill.

Application March 16, 1951, Serial No. 216,075

7 Claims. (Cl. 317—147)

This invention relates to voltage sensitive electrical apparatus and more particularly to a critically voltage responsive control circuit for performing one control operation when an applied, fixed frequency voltage is of one specified value and for performing another control operation when the applied voltage is of another specified value. It is an object of the invention to provide improved apparatus of that character.

In a voltage sensitive control circuit or apparatus constructed in accordance with one embodiment of the invention, when the applied voltage is increased minutely above a predetermined value the voltage across and the current through a control device included in the circuit are increased by substantial increments, which, for example, may amount to a 100% or greater increase. Accordingly, the control circuit, and in particular the control device, may be made critically responsive to the predetermined voltage if the control device is adjusted to be operatively responsive to a voltage or current lying anywhere within said increments of increase. Also, where the increment or range of increase is large, the control device may be made responsive to a voltage or current falling within the lower portion of that range whereby the large increase well above the critical value assures a very rapid and positive actuation of the control device.

A similar reaction causing reverse operation of the control device may be obtained by the control circuit when the level of the applied voltage drops minutely below the same or another predetermined value.

It is another object of the invention to provide an improved voltage responsive control circuit or apparatus including a voltage or current sensitive control device, said control circuit being critically responsive to a predetermined value of voltage applied thereto even though said control device is adjusted to be operatively responsive to a voltage or current falling anywhere within a substantial range of values.

According to one embodiment of the invention the two, predetermined, critical voltage levels may readily be independently controlled or determined by means which automatically and substantially alter the characteristics of the control circuit or apparatus when the current in the circuit is increased and decreased through said substantial increments.

It is another object of the invention to provide an improved voltage sensitive control circuit or apparatus including an electrically sensitive control device, said control circuit being critically responsive to perform two control operations when a voltage applied to said circuit passes through respective, independently determinable values, even though said electrically responsive device is adjusted to be operatively responsive to voltages or currents falling anywhere within substantial ranges of values.

One application of such a critically responsive control circuit or apparatus is to the control of machinery which is to be disconnected from a given power source when the voltage of that source falls below a predetermined minimum operating value, and which is to be reconnected to that source when the voltage thereof returns to a reasonable operating value. In such cases the machinery may be connected, if desired, to a reserve source of electrical power when disconnected from the primary source. The objective of such a system may be to maintain at all times a power supply of predetermined voltage range or may be merely to disconnect the machinery from a given power supply when the voltage of that supply falls below a predetermined minimum operating voltage.

The invention, together with further objects and advantages thereof, will best be understood by reference to the following description taken in connection with the accompanying drawing, and its scope will be pointed out in the appended claims.

In the drawing, in which like parts are designated by like reference numerals,

The circuits illustrated in Figs. 1 to 4 are particularly adapted to the controlling of another circuit or device in response to variations in the voltage level of electric power of predetermined frequency applied thereto. For example the control circuit may provide for connection of a load device to the applied voltage when the magnitude of that voltage reaches a predetermined value and to disconnect the load device from the applied voltage when the voltage level falls below another lower predetermined value.

Figure 1:
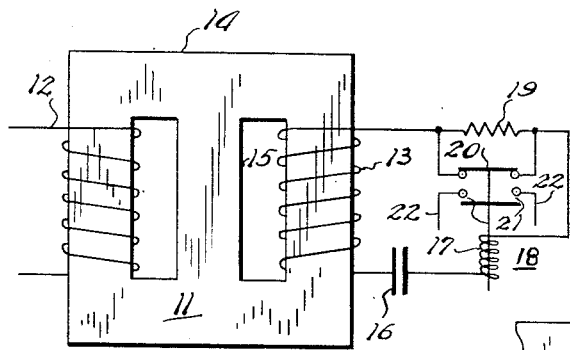
Fig. 1 is a diagram illustrating one embodiment of the invention.

In Fig. 1 there is illustrated a transformer 11 having a primary winding 12, a secondary winding 13, a core 14, and leakage reactance means. The means employed in the illustrated embodiments for providing high leakage reactance is a magnetic shunt 15 which may be continuous as illustrated or may have an air gap therein.

Connected across the secondary winding 13 there is arranged in series a condenser 16, the operating coil 17 of a relay 18, and a resistor 19. Arranged in parallel with the resistor 19 are a pair of normally closed contacts 20 of the relay 18, which contacts, when closed, short circuit the resistor. With this arrangement the resistor 19 is included in the circuit when the relay 18 is energized but is short circuited and hence ineffective when the relay is deenergized. The purpose of this arrangement will become apparent subsequently.

It is well understood in the art that where an inductive and a capacitive reactance are employed in a circuit, each reactive unit having a fixed inductance or capacitance, the circuit will be resonant at a fixed or definite frequency which may be predetermined. However, the principal inductive element of the circuit illustrated in Fig. 1, namely the high leakage reactance transformer 11, has an inductance value which varies with the current in the circuit, since the leakage reactance is a function of the current. Accordingly, with a fixed frequency of applied electric power the circuit will be resonant or near resonant when the current in the circuit is within a certain predeterminable range of values. When the current in the circuit is of a magnitude smaller than the currents lying within that range the leakage reactance is relatively large with the result that the inductive reactance of the circuit is too great relative to the capacitive reactance to produce resonance in the circuit with the same fixed frequency of the applied electric power. When the current in the circuit is of a greater magnitude than the currents within the resonant range, the leakage reactance of the transformer 11 is relatively low with the result that the inductive reactance of the circuit is too small relative to the capacitive reactance of the circuit to provide an exact resonant condition in the circuit. This characteristic of the transformer is desirable for reasons which will subsequently become apparent.

The use of a transformer as the principal inductive element in the circuit has the further advantage that it may serve also to transform the applied electric power to a more desirable voltage and to isolate the control circuit from the applied voltage.

Figure 5:
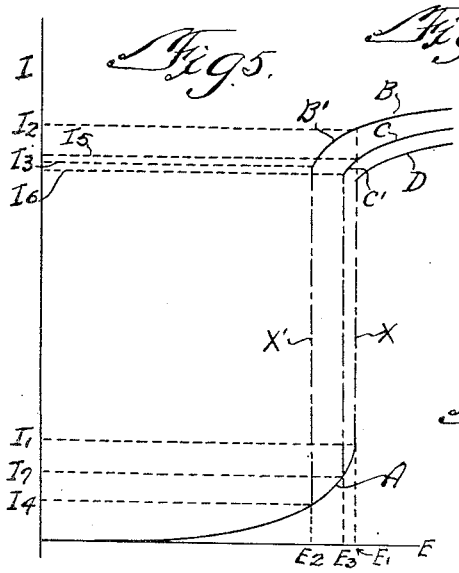

The variable leakage reactance of the transformer produces results which may best be understood by reference to Fig. 5. In that figure the current in the circuit, and, more particularly, in the secondary winding 13 of the transformer and in the operating coil 17 of the relay 18, is shown plotted against the voltage E applied to the primary winding 12 of the transformer. If the applied voltage E is raised slowly from zero value, the current in the circuit will follow the curve A, rising very slowly at first and then somewhat more rapidly, as the voltage nears the values $E_1$. The current begins to rise more rapidly as the voltage nears that value because the smaller leakage reactance in the transformer 10 11 resulting from the increased current in the secondary winding 13 brings the circuit nearer to a resonant condition.

When the applied voltage reaches the value $E_1$ the current has the value designated $I_1$. If now the applied voltage is raised minutely above the value $E_1$ the current in the circuit will leap substantially instantaneously from the value $I_1$ to a substantially larger value. If there is a relatively small value of resistance in the circuit, for example, only the resistance of the transformer winding 13 and the operating coil 17 of the relay 18, the current will be of the value $I_2$ and will follow the curve designated B as the voltage is further increased. The plot of current versus voltage is interrupted at the voltage value $E_1$ and intermediate values are not obtainable experimentally. Accordingly, in the Fig. 5, the two curve portions A and B are shown connected only by a dotted line X.

This characteristic of the circuit is believed to result from the fact that any increase in current above the value $I_1$ brings the circuit enough closer to a resonant condition that a smaller voltage is actually required to maintain that slightly increased current than was required to maintain the current $I_1$. Accordingly, the current increases substantially instantaneously through some value at which the circuit is exactly resonant, on up to a value $I_2$, whereupon the circuit is substantially removed from exact resonance and requires an applied voltage equal to $E_1$ to maintain the current.

The ultimate effect, in any event, is that with a minute increase of the applied voltage above the value $E_1$ the current increases substantially instantaneously by a substantial increment, namely from the value $I_1$ to the value $I_2$. In the illustrated example the current $I_2$ is actually several times the value of $I_1$. However, the percentage increase in current depends upon the characteristics of the circuit, and one desirable characteristic of the invention requires only that the current increase by a substantial increment with a minute increase in the voltage above the value $E_1$. More specifically, the applied voltage need be increased by a very small amount above the value $E_1$ to cause the current to increase by a substantial increment.

Since the current in question passes through the operating coil 17 of the relay 18 it will be apparent that the relay may readily be made to be actuated by the large current $I_2$ and be unresponsive to the relatively small current $I_1$. Accordingly a minute increase in voltage above the value $E_1$ will always cause operation of the relay without the necessity of adjusting the relay to operate on a very precise current or voltage value. More particularly the relay may be adjusted to pick up or be actuated by a current value lying anywhere between the values $I_1$ and $I_2$.

If the percentage increase in current is very substantial, for example, as is suggested in Fig. 5, the relay or other control device can be adjusted to be actuated by a current only slightly greater than $I_1$. Then when the current leaps from $I_1$ to $I_2$ the relay will be moved to its energized position very rapidly and positively. Accordingly, the response of the relay is not only critical but is rapid and positive.

A pair of contacts 21 are arranged on the relay 18 for controlling a load device of any desired character, a pair of leads 22 being shown for connecting the contacts 21 with such load device. When the applied voltage is raised minutely above the value $E_1$ the relay 18 will always pickup or be energized to close the contacts 21 and cause any desired actuation of the load circuit. For example, a motor circuit may be controlled to initiate or interrupt operation of the motor. The relay contacts 21 may be normally opened as illustrated, or normally closed, or two or more pairs of contacts may be arranged on the relay for controlling two or more elements of a circuit or circuits.

In the circuit illustrated in Fig. 1 the characteristics thereof are altered by the energization of the relay 18 since this opens the contacts 20 and, in effect, inserts the resistance 19 into the circuit, all as will be subsequently explained in detail. For a better understanding of the invention, however, the operation of the circuit will first be described on the assumption that the resistance of the circuit remains very small.

Under such conditions, if the applied voltage E is now reduced, the current will follow the curve B—B' down to the current value $I_3$ and the voltage value $E_2$, the latter being smaller in magnitude than the value $E_1$. As the voltage is further reduced the current will drop substantially instantaneously from the value $I_3$ to a value $I_4$ on curve A. The plot of current versus voltage is again interrupted at the voltage value $E_2$, but with decreasing voltage, and accordingly the two curve portions B' and A are shown connected only by a dotted line X'.

If the relay is so designed and adjusted that it will drop out at a current value lying anywhere between the values $I_3$ and $I_4$ it will be critically responsive to the decreasing of the applied voltage through the value $E_2$.

The sudden drop in current resulting when the applied voltage is reduced to any particular value such as $E_2$, is probably explainable on the theory that the circuit is close to an exact resonant condition when the current is of the value $I_3$. Any further reduction in applied voltage results in a smaller current which in turn requires a larger voltage to maintain it. This is obviously an unstable condition and the current continues to drop until it is of such a low value, for example $I_4$, that it can be maintained by the voltage $E_2$ even though the circuit is not resonant.

In any event, once the circuit is made to operate on the curve B, a decrease in the applied voltage below a certain value $E_2$, smaller than $E_1$, will cause the current to decrease substantially instantaneously by a substantial increment. The relay 18 may then be made critically responsive to the voltage $E_2$ if it is adjusted to drop out with a value of current lying anywhere between the values $I_3$ and $I_4$.

As previously indicated, the characteristics of the circuit illustrated in Fig. 1 are altered when the relay 18 becomes energized since, under these conditions, the normally closed contacts 20 are opened and the resistor 19 thereby is inserted in the circuit. With this additional resistance in the circuit the characteristics of the circuit are altered to those illustrated by the curves A, C and C' in Fig. 5. Accordingly, with the voltage E raised minutely above the value $E_1$ the relay will be energized and the current will be of the value $I_5$. However, the range of current values from $I_1$ to $I_2$ is available for energizing the relay since the characteristics of the circuit are those illustrated by the curve B until the relay picks up. This is an important advantage of the variable resistance means comprising the resistor 19 and the relay contacts 20 since more rapid and more reliable relay operation is obtained by the larger increment of current increase.

With the relay 18 energized, that is with the resistance 19 in the circuit, if the applied voltage E is lowered the current will follow the curve C—C' to the current value $I_6$ and the voltage value $E_3$. As the voltage is reduced further the current will drop substantially instantaneously to a value $I_7$ on the curve A. The presence of the resistance 19 in the circuit shifts the critical drop out voltage upwardly but operation of the circuit is unchanged in principle. By substituting resistors of different values for the resistor 19 it is possible to alter the drop out voltage to any desired value lying between $E_1$ and $E_2$, the latter voltage being determined and limited by the fixed resistance in the circuit. In the circuit of Fig. 1, then, there are provided resistance means, comprising the resistor 19 and the normally closed relay contacts 20, through which the drop out voltage may be selected (by selection of a particular resistance value) while retaining the maximum increment of current increase for energizing the relay (by maintaining low resistance in the circuit during the relay pickup operation).

Figure 2:
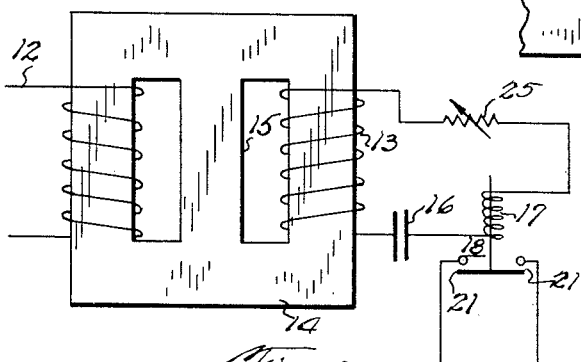
Fig. 2 is a similar diagram illustrating another embodiment of the invention.

In the embodiment of the invention disclosed in Fig. 2 a different resistor means 25 is employed which is manually variable. Alternatively, however, the resistance value may vary automatically in accordance with the current in the circuit. In the latter case the resistor may comprise resistance material with a relatively large positive temperature coefficient of resistance. In either case, the characteristics of the resistor 25 may be so chosen that either automatically or by manual operation, the resistor has a very low resistance when the current in the circuit is no larger than $I_1$. Under these conditions the operation of the circuit might, for example, be characterized by the curves A and B in Fig. 5. When the current in the circuit increases substantially, as for example, to values such as $I_2$ and $I_5$, the resistance is increased either automatically or by manual operation to a substantial magnitude. Under these conditions the operation of the circuit may be characterized for example by the curves A and C in Fig. 5. With such an arrangement the relay 18 may be made to pickup when the voltage rises minutely above the value $E_1$, and to drop out when the voltage drops minutely below the value $E_3$, for example. In other words the operation of this circuit may be quite similar to the operation of the circuit illustrated in Fig. 1.

Figure 3:
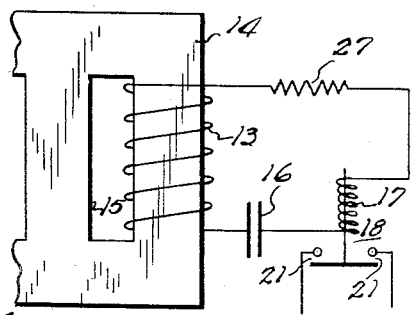
Fig. 3 is a similar diagram illustrating still another embodiment of the invention.

The invention is illustrated in a simpler embodiment in Fig. 3, which embodiment lacks certain advantages of those illustrated in Figs. 1 and 2 and described above. In Fig. 3 a simple resistor 27 is substituted for the variable resistance 25 of Fig. 2 and for the resistance means disclosed in Fig. 1, namely the resistor 19 in combination with the normally closed contacts 20 of the relay 18.

The fixed resistor 27 shown in Fig. 3 may actually be a separate resistor element as illustrated or may in fact be only the inherent resistance of the various elements of the circuit such as the transformer winding, the relay operating coil 17, and the various conductors necessary to the circuit. In any event with a substantial fixed resistance in the circuit the operation of the circuit may be characterized by the curves A and B or the curves A and C of Fig. 5. Assuming that the curves A and C are in fact characteristic of the circuit it will be apparent that the critical pickup voltage will be of the value $E_1$ while the critical drop out voltage will be of the value $E_3$. It is believed that the operation of the circuit illustrated in Fig. 3 will be apparent in view of the detailed explanations of the operation of the circuits illustrated in Figs. 1 and 2.

In the simplified circuit illustrated in Fig. 3 the drop out voltage may be determined within limits by selection of the proper resistance value for the resistor 27. However, this circuit has the disadvantage that it does not provide as large an increment of current increase for energization of the relay 18 as may be obtained where the resistor is by-passed when the relay is de-energized.

Figure 4:
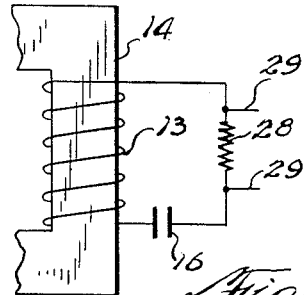
Fig. 4 is a similar diagram, partially broken away, illustrating still another embodiment of the invention; and, Fig. 5 is a graph illustrating certain operating characteristics of the circuits shown in Figs. 1 to 4.

In Fig. 4 there is illustrated a variation of the circuit shown in Fig. 3. A resistor 28 is arranged in series with the secondary winding 13 and the condenser 16, no relay being included in the circuit. A pair of leads 29 are shown connected to opposite ends of the resistor 28, which leads may be connected to a load device (not shown in the drawing) which the circuit is to control.

The variation of the current in this circuit may be made identical to that of the circuit of Fig. 3. In the circuit of Fig. 4, however, the current variation is utilized to product a control voltage, namely the voltage across the resistor 28, for controlling the load device mentioned above. It will be readily understood that when the current in the circuit is increased or decreased by a substantial increment, in accordance with preceding detailed explanation, the control voltage appearing across the resistor 28 will vary in proportion.

In any of the circuits disclosed the resistance value of the circuit, whether it be fixed as in Figs. 3 and 4 or variable as in Figs. 1 and 2, may be made of such a value that the drop out voltage is equal to the pickup voltage. The operation of such a circuit is illustrated in Fig. 5 by the curves A and D. Such a resistance value may readily be determined since a resistance value which is too low will result in a drop out voltage lower than the pickup voltage while a resistance value which is too high will result in a continuous curve sloping upwardly and to the right in Fig. 5, even at its steepest portion. A circuit having equal drop out and pickup voltages may be desired, for example, where the applied voltage is arbitrarily varied and the load device under the control of the illustrated circuits is intended to count or otherwise record pulses in the applied voltage.

A circuit arranged in accordance with the invention has various advantages over previously known voltage sensitive devices. The circuit has the characteristic that when the level of the applied voltage increases by a minute amount above one critical value the current in the circuit is increased by a substantial increment, with the result that the relay or other current sensitive control device may be energized, provided only that the critical operating current lies anywhere within said substantial increment of current change. Similarly when the voltage level subsequently decreases by a minute small amount below another critical value the current in the circuit drops substantially instantaneously by a substantial increment. Accordingly, the relay or other control device may be made to become de-energized provided only that the critical current for such effect lies anywhere within said substantial increment of current change.

The relay is critically responsive then to a certain pickup voltage and to another certain drop out voltage without the relay itself being critically adjusted to operate at a certain definite current value or values. The relay may on the contrary be responsive to currents lying anywhere within a substantial range or ranges of values.

Furthermore, the critical voltages for energizing and for de-energizing the relay are independently determined, in Figs. 1 and 2, by resistor means comprising the variable resistance 25 or the resistor 19 in combination with the normally closed relay contacts 20. The resistor means in each case is manually or automatically variable with the current flowing in the circuit. In the case of the circuit disclosed in Fig. 2 the resistance of the resistor itself increases substantially either automatically or by manual operation with an increase in current, while the resistance in the circuit disclosed in Fig. 1 increases by a substantial amount when the applied voltage exceeds a predetermined value since the increased current resulting therefrom causes the relay to open the contacts 20 and put the resistor 19 effectively in the circuit. The resistor means disclosed in Figs. 1 and 2 further permit control of the drop out voltage while permitting a maximum increment of current increase for the pickup operation.

It is well understood in the art, of course, that the actuation of a control device such as a relay commonly is accomplished by conditions differing from those which cause de-energization or deactuation of the relay. More specifically a relay may pick up with one current value but drop out with a different current value, which is usually lower. In the case of a common magnetically operated relay this results primarily from the fact that with a given current in the operating coil the armature is more firmly attracted to the core after it has been picked up than before.

Many embodiments of the invention will immediately become apparent to those skilled in the art in view of the embodiments disclosed herein. For example, an adjustable resistor might be substituted for the resistor 19 in Fig. 1 in order that the drop out voltage $E_4$ might readily be regulated. Similarly an adjustable resistor might be inserted in any of the circuits disclosed in order to vary the value of the drop out voltage. A variable condenser might also be substituted for the condenser 16 or arranged in parallel therewith in order to vary the characteristics of the circuit, and, in particular, the pickup voltage. Still further, the control device included in the circuit need not be a relay, such as the relay 18, but can be any form of control device which is capable of producing a control signal dependent upon the current passing therethrough or on voltage thereacross. It may also be a thermally responsive device or an electron tube such as a thyratron.

Accordingly, while particular embodiments of the invention have been shown, it will be understood, of course, that the invention is not limited thereto since many modifications may be made, and it is, therefore, contemplated to cover by the appended claims any such modifications as fall within the true spirit and scope of the invention.

The invention having thus been described, what is claimed and desired to be secured by Letters Patent is:

1. A control circuit critically responsive to the voltage level of applied electric power of substantially constant frequency, said circuit including a transformer having a primary winding and a secondary winding wound on a common core including high leakage reactance means, a condenser, a resistor, and a relay; said secondary winding being arranged in series with said condenser, said resistor and the operating coil of said relay, and said resistor being arranged in parallel with a normally closed pair of contacts on said relay.

2. A control circuit critically responsive to the voltage level of applied electric power of substantially constant frequency, said circuit including a transformer having a primary winding and a secondary winding wound on a common core including high leakage reactance means, a condenser, a resistor, and a relay; said secondary winding being arranged in series with said condenser, said resistor and the operating coil of said relay, and said resistor being arranged in parallel with a normally closed pair of contacts on said relay, the inductive and capacitive reactance values of the elements of said circuit being of such magnitude relative to each other and to the other constants of the circuit and the applied electric power that when the voltage of said applied power increases minutely beyond a predetermined magnitude the current in said operating coil of said relay increases substantially instantaneously by a substantial increment, and when the voltage of said applied power subsequently decreases minutely below another predetermined magnitude, lower than said first-mentioned predetermined magnitude, said current decreases substantially instantaneously by a substantial increment.

3. A control circuit critically responsive to the voltage level of applied electric power of substantially constant frequency, said circuit including a transformer having a primary winding and a secondary winding wound on a common core including high leakage reactance means, a condenser, a resistor, and a relay; said secondary winding being arranged in series with said condenser, said resistor and the operating coil of said relay, and said resistor being arranged in parallel with a normally closed pair of contacts on said relay, the inductive and capacitive reactance values of the elements of said circuit being of such magnitude relative to each other and to the other constants of the circuit and the applied electric power that when the voltage of said applied power increases minutely beyond a predetermined magnitude the current in said operating coil of said relay increases substantially instantaneously by a substantial increment, and when the voltage of said applied power subsequently decreases minutely below another predetermined magnitude, lower than said first-mentioned predetermined magnitude, said current decreases substantially instantaneously by a substantial increment, the required magnitude of current to pick up said relay lying within said first-mentioned substantial increment and the drop out current value of said relay lying within said second-mentioned substantial increment.

4. A control circuit critically responsive to the voltage level of applied electric power of substantially constant frequency, said circuit including a transformer having a primary winding and a secondary winding wound on a common core, said core including a magnetic shunt magnetically disposed between said windings, a condenser, resistance means, and a relay, said secondary winding being arranged in series with said condenser, said resistance means and the operating coil of said relay, the resistance value of said resistance means being variable with the current in said secondary winding and increasing as said current increases, the inductive and capacitive reactance values of the elements of said circuit being of such magnitude relative to each other and to the other constants of the circuit and the applied electric power that when the voltage of said applied power increases minutely beyond a predetermined magnitude the current in said operating coil of said relay increases substantially instantaneously by a substantial increment, and when the voltage of said applied power subsequently decreases minutely below another predetermined magnitude, lower than said first-mentioned predetermined magnitude, said current decreases substantially instantaneously by a substantial increment, the required magnitude of current to pick up said relay lying within said first-mentioned substantial increment and the drop out current value of said relay lying within said second-mentioned substantial increment.

5. A control circuit critically responsive to the voltage level of applied electric power of substantially constant frequency, said circuit including a transformer having a primary winding and a secondary winding wound on a common core, said core including a magnetic shunt magnetically disposed between said windings, a condenser, a resistor, and a relay; said secondary winding being arranged in series with said condenser, said resistor and the operating coil of said relay, and said resistor being arranged in parallel with a normally closed pair of contacts on said relay, the inductive and capacitive reactance values of the elements of said circuit being of such magnitude relative to each other and to the other constants of the circuit and the applied electric power that when the voltage of said applied power increases minutely beyond a predetermined magnitude the current in said operating coil of said relay increases substantially instantaneously by a substantial increment, and when the voltage of said applied power subsequently decreases minutely below another predetermined magnitude, lower than said first-mentioned predetermined magnitude, said current decreases substantially instantaneously by a substantial increment, the required magnitude of current to pick up said relay lying within said first-mentioned substantial increment and the drop out current value of said relay lying within said second-mentioned substantial increment.

6. A control circuit critically responsive to the voltage level of applied electric power of substantially constant frequency, said circuit including a transformer having a primary winding and a secondary winding wound on a common core, said core including a magnetic shunt magnetically disposed between said windings, a condenser, variable resistance means whose resistance value is sharply increased for an increase in current in the circuit of said secondary winding, and a control device, said secondary winding, said condenser, said resistance means and said control device being connected in series circuit relationship, the inductive and capacitive reactance values of the elements of said series circuit being of such magnitude relative to each other and to the other constants of the circuit and the applied electric power that when the voltage of said applied power increases minutely beyond a predetermined magnitude the current in said series circuit increases substantially instantaneously by a substantial increment, and when the voltage of said applied power subsequently decreases minutely below another predetermined magnitude, lower than said first-mentioned predetermined magnitude, said current decreases substantially instantaneously by a substantial increment, the required magnitude of current to effect energization of said control device lying within said first-mentioned substantial increment and the deenergization current value of said control device lying within said second-mentioned substantial increment.

7. A control circuit critically responsive to the voltage level of applied electric power of substantially constant frequency, said circuit including a transformer having a primary winding and a secondary winding wound on a common core, said core including a magnetic shunt magnetically disposed between said windings, a condenser, a resistor, a control device, said secondary winding, said condenser, said resistor and said control device being connected in series circuit relationship, and a normally closed pair of contacts in parallel with said resistor and adapted to be operated by said control device, the inductive and capacitive reactance values of the elements of said series circuit being of such magnitude relative to each other and to the other constants of the circuit and the applied electric power that when the voltage of said applied power increases minutely beyond a predetermined magnitude the current in said series circuit increases substantially instantaneously by a substantial increment, and when the voltage of said applied power subsequently decreases minutely below another predetermined magnitude, lower than said first-mentioned predetermined magnitude, said current decreases substantially instantaneously by a substantial increment, the required magnitude of current to effect energization of said control device lying within said first-mentioned substantial increment and the deenergization current value of said control device lying within said second-mentioned substantial increment.

References Cited in the file of this patent

UNITED STATES PATENTS

| Number | Name | Date |
|---|---|---|
| 1,142,852 | Simon | June 5, 1915 |

(Other references on following page)

UNITED STATES PATENTS

| Number | Name | Date |
|---|---|---|
| 1,466,260 | Wensley | Aug. 28, 1923 |
| 1,994,325 | Suits | Mar. 12, 1935 |
| 2,047,845 | Wirz | July 14, 1936 |
| 2,117,843 | Green | May 17, 1938 |
| 2,305,407 | Crago | Dec. 15, 1942 |
| 2,310,097 | Langguth | Feb. 2, 1943 |
| 2,444,715 | Walker | July 6, 1948 |
| 2,482,820 | Wolfson | Sept. 27, 1949 |

FOREIGN PATENTS

| Number | Country | Date |
|---|---|---|
| 713,085 | Germany | Oct. 31, 1941 |